UNITED STATES PATENT OFFICE.

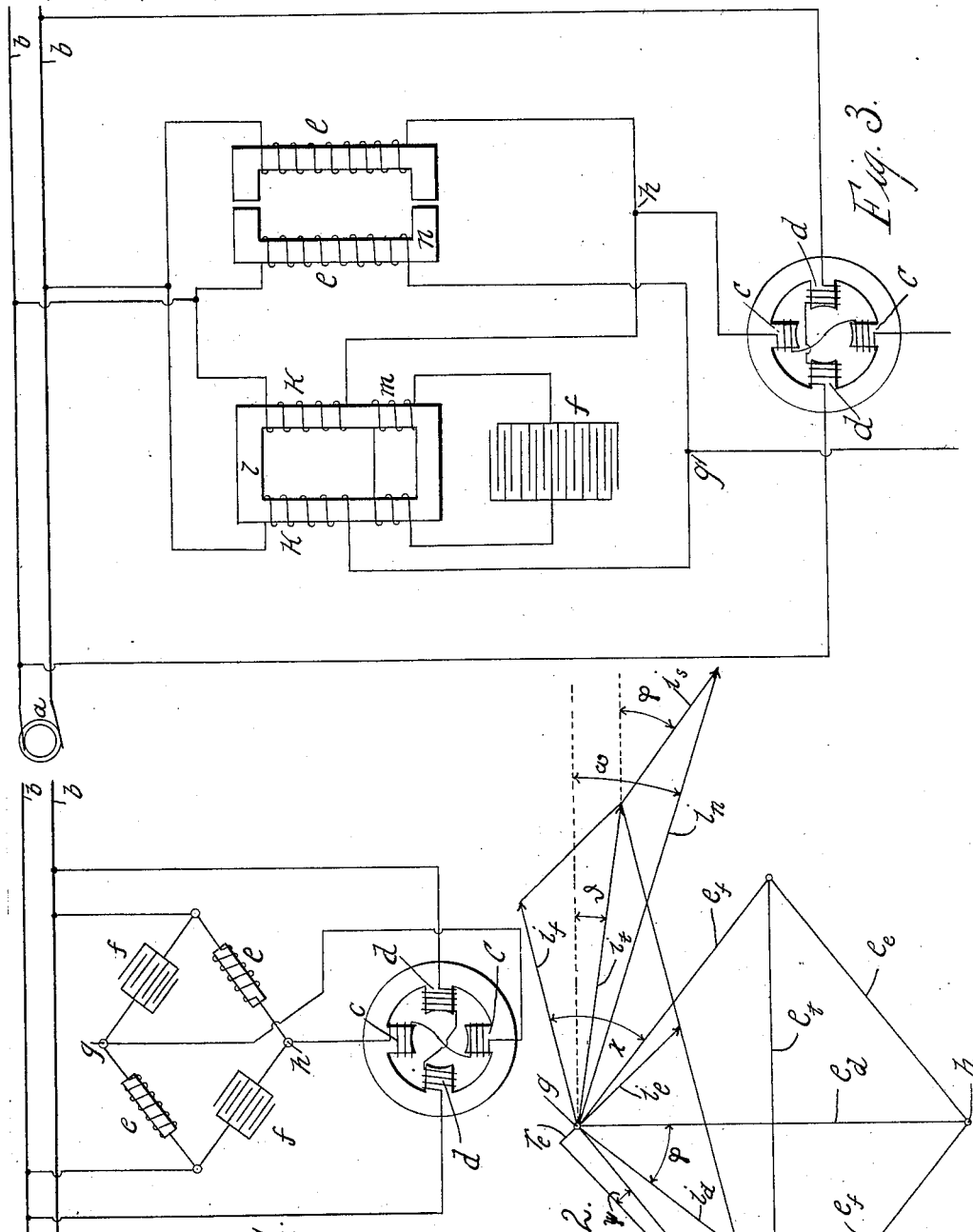

JOHANNES HEINRICH FRIEDRICH GÖRGES, OF BERLIN, GERMANY, ASSIGNOR TO THE SIEMENS & HALSKE ELECTRIC COMPANY OF AMERICA, OF CHICAGO, ILLINOIS.

SYSTEM OF ALTERNATING-CURRENT TRANSMISSION.

SPECIFICATION forming part of Letters Patent No. 655,341, dated August 7, 1900.

Application filed October 11, 1899. Serial No. 733,294. (No model.)

*To all whom it may concern:*

Be it known that I, JOHANNES HEINRICH FRIEDRICH GÖRGES, a subject of the Emperor of Germany, residing at Berlin, Germany, have invented a certain new and useful Improvement in Systems of Alternating-Current Transmission, (Case No. 243,) of which the following is a full, clear, concise, and exact description, reference being had to the accompanying drawings, forming a part of this specification.

My invention relates to alternating-current-transmission systems, and has for its object the provision of improved means for adjusting the difference in phase between the independent field-windings of induction-motors or the fields of meters employing induction motive members for operating the indicators or recording elements.

A well-known means for effecting the required phase adjustment is that in which a Wheatstone bridge is employed suitably connected in circuit with one of the field-windings or sets of field-windings of the motor, two sides of the bridge-circuit containing retardation or impedance coils and the remaining two sides of the bridge-circuit containing condensers. Two condensers are thus required in connection with each bridge-circuit; and it is the prime object of my invention so to associate a single condenser with the bridge-circuit that the desired capacity in two of the opposite sides of the Wheatstone bridge may be secured by the employment of this single condenser. This result I am enabled to accomplish through the agency of a transformer whose primary windings form the windings in the opposite sides of the bridge-circuit in which the phase is to be advanced, the secondary of the transformer having two windings in inductive relation with the aforesaid windings, a condenser being included in this secondary winding, which then, obviously, is capable of advancing the phase in the primary windings.

By means of my invention I am enabled to use a small condenser, which, coöperating with the transformer-coils, serves properly to furnish the desired capacity. This is a great advantage, as in actual practice where dry condensers are employed for effecting the regulation of motors for performing power work, and where these condensers have been included directly in a bridge-circuit, their size has had to be great to perform the desired work, and I am thus enabled not only to employ a single condenser to furnish the capacity for opposite sides of a bridge-circuit, but am enabled where power-motors are to be regulated greatly to reduce the size of the condenser.

I will explain my invention more particularly by reference to the accompanying drawing, in which—

Figure 1 illustrates a diagrammatic arrangement of a system in which the phase between the exciting-circuits of the motor is regulated by means of condensers in opposite sides of a Wheatstone-bridge circuit. Fig. 2 is a diagram illustrating the mathematical problems employed. Fig. 3 illustrates my improved means for regulating the phase difference between the exciting-circuits of the motor.

Like letters indicate like parts throughout the different figures.

Fig. 1, illustrating the means heretofore employed, shows a source of single-phase alternating current $a$, supplying current to the mains $b\ b$. In parallel branches between the mains are included the sets of windings $c$ and $d$. The motor illustrated is a power-motor. It is obvious that if the motor were employed in a wattmeter the branch circuits, including the exciting-windings of the motor, would not be in parallel bridges between the mains. The Wheatstone bridge is directly connected between the mains, two opposite sides of the bridge including the impedance or retardation coils and the remaining opposite sides including the condensers $f\ f$. The condensers and the retardation-coils serve to secure the proper adjustment of the phase at the terminals $g$ and $h$, as is well known. A diagonal of the Wheatstone bridge connects the terminals $g$ and $h$, this diagonal including the windings $c$ of the motor.

In the preferred embodiment of my invention I have replaced the condensers $f\ f$ by coils $k\ k$, Fig. 3, of the transformer $l$. This transformer is constructed with three windings, the two primary windings $k\ k$ being included in opposite branches of the Wheatstone bridge and the secondary winding $m$ being connected directly in circuit with a condenser $f$. I also preferably employ a divided core $n$, upon which I place both of the retardation-coils $e\ e$. With the condenser arranged as thus shown I am enabled to secure the required capacity without resorting to the use of a large number of condensers and can thus secure the additional advantage of a high-power factor due to the use of condensers in the Wheatstone-bridge circuit. It is essential to have the power factor as high as possible in meters and in power-motors which are operated as two-phase motors from a single-phase supply-circuit. The current required is hereby greatly reduced and disturbances on the supply-circuit are not so frequent and deleterious. The use of condensers also materially reduces the amount of power which is uselessly consumed in the bridge-circuit to a minimum, the power consumed very nearly approaching the true power necessary to excite the coils of the instrument included therein.

In previous systems in which condensers were not employed the actual power traversing the shunt-circuit was greater than that necessary in the operation of the shunt-coils, as there was always some electrical path which did not include the shunt-coils through which current might pass from one main to another, the power lost in this path being wasted. In the present invention, as will be clear from the phase-diagram, the power lost in the sides of the Wheatstone bridge is decreased materially, as there are no artificial resistances employed therein. This will be apparent from Fig. 2, in which the voltages and currents in the separate circuits are graphically represented. The pressures $e_e$ across the self-inductive branches $e$ and the pressures $e_f$ across the capacity branches $f$ form a closed parallelogram, the impressed pressure $e_t$ being the pressure across the extremities thereof. The diagonal pressure $e_d$ is the pressure across the middle terminals $g\ h$ of the network. The current $i_d$ in the diagonal branch lags behind its pressure $e_d$ by an angle $\varphi$. The current $i_f$ in the capacity branch of the circuit leads its pressure by an angle $x$. The geometrical combination of these two currents gives the current $i_e$ in the self-inductive branch of the bridge. I preferably use equal inductances and equal capacities in the opposite branches. The total current $i_t$ traversing the bridge-circuit will then be equal to the geometrical sum of the current $i_f$ in the capacity branch and the current $i_e$ in the self-inductive branch thereof. This current $i_t$ lags behind the impressed pressure by an angle $\vartheta$, which is exceedingly small, and thereby insures a high-power factor. The current $i_e$ is seen to lag behind its pressure $e_e$ nearly ninety degrees, thereby minimizing the power absorbed in the self-inductive branches. The lag of the current is represented by the angle ninety degrees minus $\Psi$, the line $r_e$ being an extension of the line $e_e$ and forming a right angle with the line $r_a$. The power supplied to the bridge-circuit is equal to the product of the voltage supplied and that portion of the current used which is in phase with the pressure or, mathematically expressed, $e_t$ multiplied by $i_t \cos \vartheta$. It will be seen that the amount of power used is inversely proportional to the size of the angle $x$, and therefore it is essential that the capacity in the circuit be as large as possible.

The useful power employed is equal to the product of the pressure across the diagonal branch and the current in this branch which is in phase with its pressure or, mathematically expressed, $e_d$ multiplied by $i_d \cos \varphi$. To have the useful power bear a high relation to the supplied power, it is well to have the diagonal pressure be as nearly equal to the impressed pressure as possible.

The amount of current $i_n$ required to operate a single-phase motor on a two-phase current is equal to the geometrical sum of the current $i_t$ necessary for operating one phase and the current $i_s$ necessary to operate the other phase. The current $i_s$ bears the ratio $e_d\ e_t$ to the current $i_d$ and lags behind the impressed pressure by an angle $\varphi$. The total power required would again be equal to the product of the impressed pressure and the current in phase with it, or $e_t$ multiplied by $i_n \cos \omega$. This is about one hundred and fifty per cent. of the power necessary to operate the motor as a single-phaser; but as the motor will give almost double the power when operated on a two-phase current it is obvious that a great saving results by the use of this system. I do not wish to be limited to the number of secondary circuits or the number of condensers employed in all instances, as the number may in some embodiments be varied.

I have herein shown and particularly described the preferred embodiment of my invention; but it is apparent that changes in the specific arrangement thereof may readily be made without failing to realize the spirit of the invention shown, and I therefore do not wish to be limited to the precise arrangement shown; but

I claim as new and desire to secure by Letters Patent—

1. The combination with a source of alternating current, of a motor having a plurality of energizing-windings a Wheatstone bridge for effecting the phase adjustment of the energizing-windings and a secondary circuit in inductive relation with a winding of the Wheatstone bridge and including a condenser, substantially as described.

2. The combination with a source of alternating current, of a motor having two sets of windings supplied thereby, a Wheatstone bridge included in circuit with one of the sets of windings, retardation-coils included in opposite sides of the Wheatstone-bridge circuit, a transformer, two primary windings thereon included in the remaining opposite sides of the Wheatstone-bridge circuit, a secondary circuit in inductive relation to the said windings of the transformer, and a condenser in the said secondary circuit, whereby the phase is advanced in the said primary windings, substantially as described.

3. The combination with a source of alternating current, of a motor having two sets of windings supplied thereby, a Wheatstone bridge included in circuit with one of the sets of windings, retardation-coils included in opposite sides of the Wheatstone-bridge circuit, a transformer, two primary windings thereon included in the remaining opposite sides of the Wheatstone-bridge circuit, a secondary circuit in inductive relation to the said windings of the transformer, and a condenser in the said secondary circuit, whereby the phase is advanced in the said primary windings, the set of windings of the motor connected with the Wheatstone bridge being included in a diagonal conductor across the Wheatstone-bridge circuit, substantially as described.

4. The combination with a source of alternating current, of a motor having two sets of windings supplied thereby, a Wheatstone bridge included in circuit with one of the sets of windings, retardation-coils included in opposite sides of the Wheatstone-bridge circuit, said coils being mounted upon the same core, a transformer, two primary windings thereon included in the remaining opposite sides of the Wheatstone-bridge circuit, a secondary circuit in inductive relation to the said windings of the transformer, and a condenser in the said secondary circuit, whereby the phase is advanced in the said primary windings, the set of windings of the motor connected with the Wheatstone bridge being included in a diagonal conductor across the Wheatstone-bridge circuit, substantially as described.

5. The combination with a set of exciting-coils of a motor, of a Wheatstone-bridge circuit connected therewith, impedance-coils included in opposite sides of the Wheatstone-bridge circuit, a transformer, two primary windings thereon included in the remaining opposite sides of the Wheatstone-bridge circuit, a secondary circuit in inductive relation to the said windings of the transformer, and a condenser in the said secondary circuit for advancing the phase in the primary windings, substantially as described.

6. In combination with a Wheatstone-bridge circuit, a set of exciting-coils of a motor included in the diagonal of said Wheatstone-bridge circuit, retardation-coils included in two opposite sides of the Wheatstone-bridge circuit, a transformer, two primary windings thereon included in the remaining opposite sides of the Wheatstone-bridge circuit, a secondary circuit in inductive relation to the said windings of the transformer, and a condenser in the said secondary circuit, whereby the phase is advanced in the said primary windings, substantially as described.

7. The combination with a source of alternating current, of a motor having two sets of windings supplied thereby, a Wheatstone bridge included in circuit with one of the sets of windings, retardation-coils included in opposite sides of the Wheatstone-bridge circuit, a transformer, a primary winding thereon included in a side of the Wheatstone-bridge circuit, a secondary circuit in inductive relation to the said winding of the transformer, and a condenser in the said secondary circuit, whereby the phase is advanced in the said primary winding, substantially as described.

8. The combination with a source of alternating current, of a motor having two sets of windings supplied thereby, a Wheatstone bridge included in circuit with one of the sets of windings, retardation-coils included in opposite sides of the Wheatstone-bridge circuit, a transformer, a primary winding thereon included in a remaining side of the Wheatstone-bridge circuit, a secondary circuit in inductive relation to the said winding of the transformer, and a condenser in the secondary circuit, whereby the phase is advanced in the said primary winding, the set of windings of the motor connected with the Wheatstone bridge being included in a diagonal conductor across the Wheatstone-bridge circuit, substantially as described.

9. The combination with a source of alternating current, of a motor having a plurality of energizing-windings, a Wheatstone bridge for effecting the phase adjustment of the energizing-windings, and a condenser associated with but extraneous to a branch of the Wheatstone bridge to modify the phase of current flowing therethrough, substantially as described.

In witness whereof I hereunto subscribe my name this 19th day of September, A. D. 1899.

JOHANNES HEINRICH FRIEDRICH GÖRGES.

Witnesses:
 HENRY HASPER,
 WOLDEMAR HAUPT.